United States Patent [19]

Boyer

[11] Patent Number: 4,918,286
[45] Date of Patent: Apr. 17, 1990

[54] METHOD AND APPARATUS FOR CLEANING AND LUBRICATING A METAL INERT GAS WELDING GUN

[76] Inventor: Robert W. Boyer, 436 Scenic Dr., Henderson, Nev. 89015

[21] Appl. No.: 345,968

[22] Filed: May 1, 1989

[51] Int. Cl.[4] .............................................. B23K 9/12
[52] U.S. Cl. .............................. 219/137.44; 219/136
[58] Field of Search .............. 219/136, 137.43, 137.44, 219/137.52, 137.51, 137.31

[56] References Cited

U.S. PATENT DOCUMENTS

| | | |
|---|---|---|
| 3,240,233 | 3/1966 | Johnson . |
| 4,361,747 | 11/1982 | Torrani . |
| 4,450,341 | 5/1984 | Dietrick et al. . |
| 4,508,951 | 4/1985 | Rehrig, Jr. . |
| 4,609,804 | 9/1986 | Kishi et al. ...................... 219/137.43 |
| 4,733,050 | 3/1988 | Grafius ................................. 219/136 |
| 4,778,976 | 10/1988 | Litt et al. . |

OTHER PUBLICATIONS 8-page brochure entitled, Around the World with Tweco, Model No. 4-AN Tweco MIG-GUN.
4-page brochure entitled, Tweco MIG-GUN Consumable Parts Only.
6-page brochure entitled, Barsol-Industrial Solvents and Chemicals.
1-page brochure entitled, Mobil Product Data SHeet.

*Primary Examiner*—Clifford C. Shaw
*Attorney, Agent, or Firm*—Henderson & Sturm

[57] ABSTRACT

A method and apparatus for cleaning a metal inert gas arc welder gun of a type having a housing and a flexible conduit disposed in the housing. The flexible conduit has a first end for feeding a consumable welding wire therethrough and a second end adapted to engage with a tubular welding tip for selectively feeding the consumable wire through the flexible conduit and through the welding tip for use. The method involves removing the consumable wire from a major portion of the flexible conduit, injecting a liquid cleaner into the flexible conduit until some of the liquid exits the other end thereof, forcing the liquid cleaner out of theflexible conduit and moving the consumable welding wire back into the flexible conduit and tubular welding tip for use.

11 Claims, 1 Drawing Sheet

METHOD AND APPARATUS FOR CLEANING AND LUBRICATING A METAL INERT GAS WELDING GUN

TECHNICAL FIELD

The present invention relates generally to a method and apparatus for cleaning and lubricating hand held and mechanical held semi-automatic and fully automatic metal inert gas (MIG) arc welding guns, and more particularly to the use of a device for injecting a cleaning fluid and/or a lubricant into a flexible conduit liner which extends through an arc welding gun.

BACKGROUND ART

In gas metal arc (GMA) welding, also known an MIG welding, an electric arc is established between the workpiece and a consumable bare wire electrode. The arc continuously melts the wire as it is fed to the weld puddle. The weld metal is shielded from the atmosphere by a flow of an inert gas, or gas mixture.

A MIG welding gun has a flexible conduit therein for receiving a consumable welding wire. The welding wire passes from a roll into one end of the flexible conduit and is guided thereby to a welding tip where the wire extends out from such tubular welding tip for use in a welding process. It should be noted that the wire-feed speed determines the arc current. If the wire speed or current becomes inconsistent, it can cause stubbing to the workpiece or burning back to the guide tube (welding tip). Inconsistent wire speed will cause weld penetration, deposition rate, and bead size to be inconsistent.

The welding wire comes on a spool or in a coil. When the wire unwinds, it tends to take the same shape and wind itself back up much like a spring does. When the welding wire is passed through the conduit, the welding wire is being uncoiled, but the wire is still somewhat coiled. This causes friction in the conduit. The welding wire is passing through the conduit at speeds from 100 to 800 inches per minutes. This constant friction causes metal filings and other contaminants to fill the conduit and cause more friction. Dirt and contaminants on the welding wire also add to this problem. This friction and drag on the welding wire causes the wire speed to be inconsistent because the drive rolls start to slip on the wire. This causes stubbing to the workpiece or burning back to the welding tip, resulting in inconsistent weld penetration, inconsistent deposition rate, and/or inconsistent bead size. The welder will spit and sputter and produce a situation where the welding gun does not operate properly. In the past, there have been some proposed solutions to the problems, such as using something to wipe the consumable wire off as it goes into the flexible conduit. Such a solution has not been entirely successful.

In order to solve the aforementioned problem, even when a wiping device is used, once the welding gun becomes inoperative because of contaminants within the flexible conduit, the normal solution is to replace the flexible conduit. This requires considerable time and, of course, expense in purchasing the new part.

Consequently, there is a need for a solution to the aforementioned problem.

DISCLOSURE OF THE INVENTION

The present invention relates to a method and apparatus for cleaning a MIG arc welder gun of a type having a housing and a flexible conduit disposed in the housing. The flexible conduit has a first end for feeding a consumable welding wire therethrough and a second end adapted to engage with a tubular welding tip for selectively feeding the consumable wire through the flexible conduit and through the welding tip for use. The method involves removing the consumable wire from a major portion of the flexible conduit, injecting a liquid cleaner into the flexible conduit until some of the liquid exits the other end thereof, forcing the liquid cleaner out of the flexible conduit, adding lubricant to the flexible conduit, and moving the consumable welding wire back into the flexible conduit and tubular welding tip for use.

An object of the present invention is to provide an improved method and apparatus for cleaning and lubricating a MIG arc welder gun.

Another object of the present invention relates to a method of the aforementioned type which includes injecting a liquid into the flexible conduit of an arc welder gun, forcing the liquid cleaner out of the flexible conduit for cleaning the flexible conduit, and lubricating the flexible conduit before the consumable wire is reinserted into the flexible conduit.

Another object of the present invention is to permit cleaning of a MIG gun without taking it apart, thereby saving the cost of replacing the conduit.

A further object of the present invention is to permit application of a lubricant directly to the conduit and welding tip.

A still further object of the present invention is to eliminate friction between the conduit and the welding wire thereby eliminating metal fillings and contaminants from the conduit.

A still further object of the present invention is to let the wire speed remain constant, thus producing good weld quality.

A still further object of the present invention is to extend the life of the flexible conduit.

Still another object of the present invention is to extend the life of the welding tip.

A further object of the present invention is to save welding time and labor.

A still further object of the present invention is to produce a MIG gun that does not need to be cleaned as often since lubricant is used.

Other objects, advantages, and novel features of the present invention will become apparent from the following detailed description of the invention when considered in conjunction with the accompanying drawings.

BEST MODE FOR CARRYING OUT THE INVENTION

Figure 1:
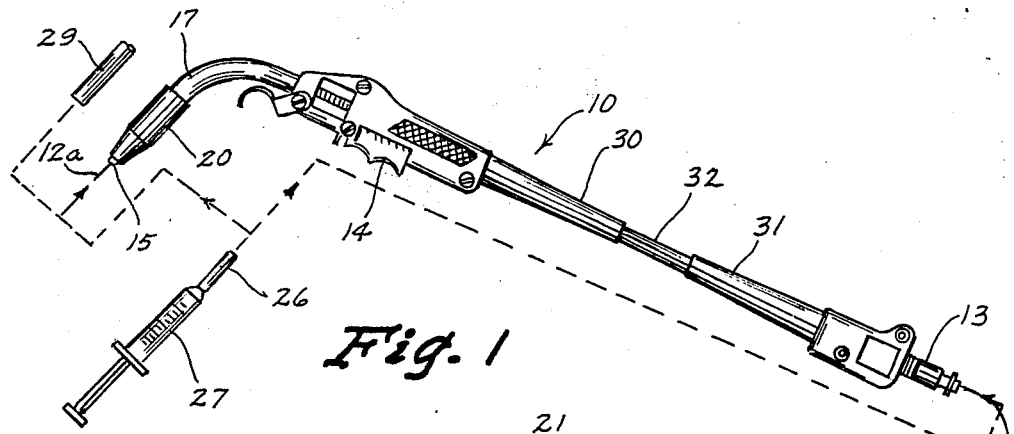
FIG. 1 is a side view of a typical arc welding gun for receiving wire from a roll continuously into one end thereof as needed through a trigger mechanism and having the end of the wire extend through a welding tip at the other end of the welding gun and showing portions of the cleaning apparatus of the present invention associated therewith.
Figure 2:
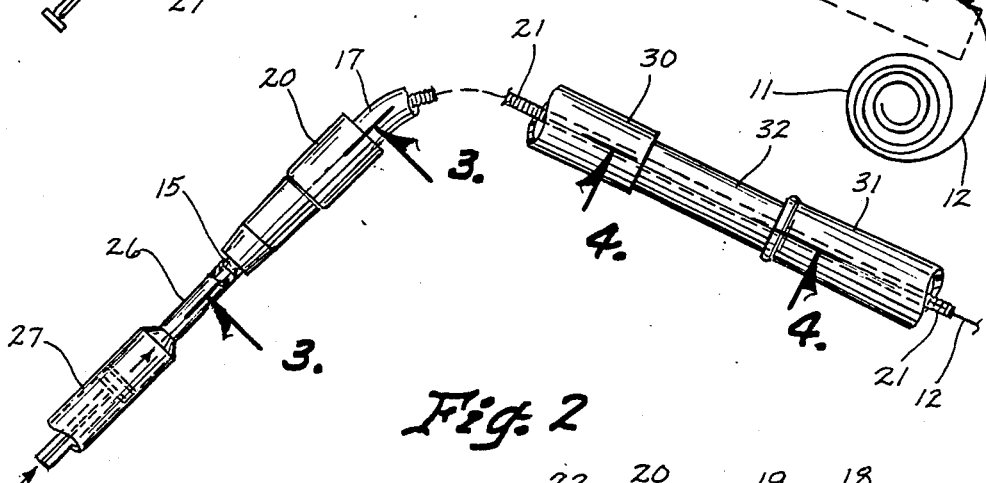
FIG. 2 is an enlarged partial side elevational view of the arc welding gun of FIG. 2 showing a liquid cleaner or lubricant being injected into the welding tip and flexible conduit of the electric arc welder gun.

Referring now to the drawings, wherein like reference numerals designate identical or corresponding parts throughout the several views, FIG. 1 shows a MIG arc welding gun (10) of a conventional configuration which has a roll (11) of wire (12) which is fed into one end (13) of the electric are welder gun (10) and which is advanced by a trigger mechanism (14) to position the end (12a) of the wire (12) to extend a desired distance out through a tubular welding tip (15). The welding tip (15) is threaded into a fitting (16).

A tube (17) threadably engages the fitting (16) and threadably engages a ceramic member (18) having C-shaped spring members (19) extending therearound. A sleeve (20) is frictionally slidably disposed on the C-shaped members (19) so that the forward end thereof can be adjusted with respect to the forward end of the welding tip (15).

Figure 3:
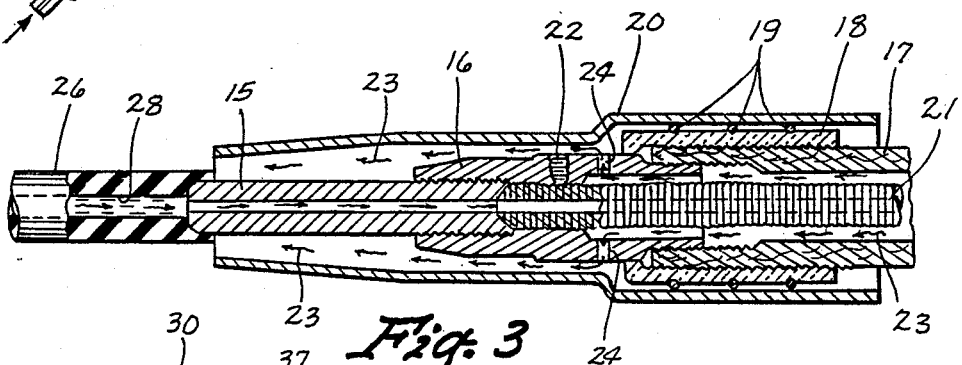
FIG. 3 is an enlarged cross sectional view taken along line 3—3 of FIG. 2 showing the liquid cleaner and/or lubricant being injected into the welding tip and into the flexible conduit of the electric arc welder gun.

A flexible conduit (21) has one end in abutment with a tapered end of the welding tip (15) and is disposed inside the tube (17) and closely inside the fitting (16). A set screw (22) is threaded down against the flexible conduit (21), as is shown in FIG. 3, for holding the flexible conduit (21) in the position shown in FIG. 3. Alternatively, the set screw (22) can be utilized to release the flexible conduit (21) when it is desired to replace the flexible conduit (21).

A shielding gas, indicated by the arrows (23), passes between tube (17) and conduit (21), out openings (24) and fitting (16) and out between the welding tip (15) and the tubular member (20) during the welding process.

When using the welding gun (10) shown in FIG. 1, if it begins to spit and sputter and otherwise becomes inefficient, this is an indication that contaminants have built up inside of the flexible conduit (21). To remedy this situation, the wire (12) is pulled towards the roll (11) at least to a position shown in FIG. 4. The wire (12) can be removed from the flexible conduit (21) altogether when cleaning, but when lubricating, it is only necessary that it be pulled back to approximately the position shown in FIG. 4.

Figure 4:
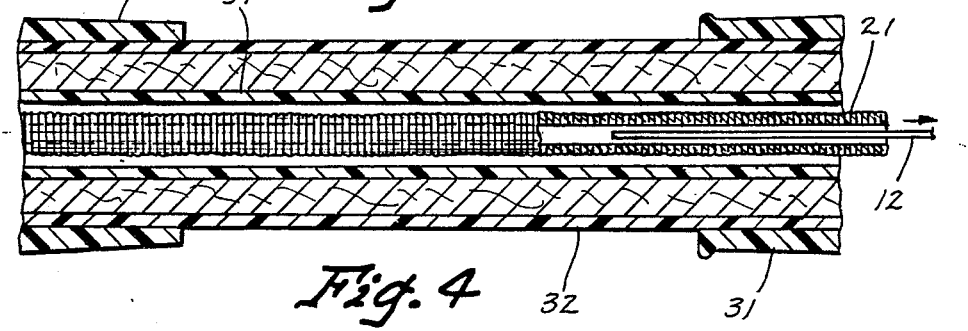
FIG. 4 is an enlarged cross sectional view taken along line 4—4 of FIG. 2 and showing how the consumable wire is removed and where the cleaning liquid passes during the cleaning process.

Then a rubber tube (26) is slipped over one end of the syringe (27) and over one end of the welding tip (15) as is shown in FIGS. 3 and 4. This adapter tube (26) can be manufactured as a part of the syringe (27) or a separate adapter hose (26) can be used as is shown. The syringe (27) is loaded with a liquid cleaner or lubricant. It is preferred that the liquid cleaner is a substance such as a product of the aliphatic hydrocarbons or a chlorinated solvent, or even these two substances mixed in equal proportions. The liquid cleaner can also have a graphite mixed therein for lubricating purposes. It is preferred to use a synthetic oil lubricant.

Especially when the welding gun (10) is to be used for aluminum, it is important that it not be contaminated by carbon products such as conventional petroleum based cleaners. Alcohol or acetone or the combination thereof carrying graphite therein is another possible cleaning liquid which can be utilized.

The cleaning liquid (28) is shown in FIG. 3 to be injected into the welding tip (15) and it is forced through the welding tip (15) and flexible conduit (21) until it comes out the fitting (13) on the other end of the welding gun (10). After that step is finished, an air hose (29) is attached over the welding tip (15) and compressed air is forced through the passageway inside the welding tip (15) and through the entire flexible conduit (21) until all of the cleaner is forced out through the fitting (13) at the other end of the welding gun (10).

It is important to note that the liquid cleaner (28) can be forced in the end (13) of the welding gun (10) if the wire (12) is first removed therefrom. If that is done, then the compressed air through hose (29) can be forced through either end just as the liquid cleaner (28) can be forced into either end of the flexible conduit (21). Additionally, other types of devices can be used to force a liquid cleaner into the flexible conduit (21), for example, instead of using a syringe (27), a squeeze bottle or toothpaste tube type of device can be used.

Once the flexible conduit (21) has been cleaned and lubricated using the process and apparatus disclosed above, the consumable wire (12) is then again put into the gun (11) and advanced to the position where the tip (12a) of the wire (12) is in a desired position for use again. The electric arc welder gun can then be used again in a normal fashion for long periods of time until the welder beings to spit and sputter and otherwise becomes inefficient, at which time the aforementioned process can be repeated instead of requiring replacement of the flexible conduit (21).

Accordingly, it will be appreciated that the preferred embodiment disclosed herein does indeed accomplish the aforementioned objects. Obviously, many modifications and variations of the present invention are possible in light of the above teachings. It is therefore to be understood that, within the scope of the appended claims, the invention may be practised otherwise than as specifically described.

I claim:

1. A method of cleaning an electric arc welder gun of a type including:
   a housing;
   a flexible conduit disposed in said housing, said flexible conduit having a first end for feeding a consumable welding wire therein, a second end adapted to engage with a tubular welding tip for selectively feeding said consumable welding wire through said other end of the flexible conduit and through said tubular welding tip;
   said method comprising:
   removing said consumable wire from a major portion of said flexible conduit;
   injecting a liquid cleaner into said flexible conduit into the first or second end thereof at least until at least some of such liquid exits the other end thereof;
   forcing the liquid cleaner from said flexible conduit;
   forcing a liquid lubricant into said flexible conduit; and
   moving said consumable wire back into the flexible conduit and tubular welding tip for use in a welding process.

2. The method of claim 1 including using a syringe to force said liquid cleaner into said flexible conduit.

3. The method of claim 2 including attaching a tubular adapter to said welding tip and to said syringe prior to using said syringe for guiding the liquid cleaner form said syringe into said welding tip and flexible conduit.

4. The method of claim 2 wherein said syringe is attached to the second end thereof.

5. The method of claim 1 wherein air under pressure is used in said step of forcing the liquid cleaner from said flexible conduit.

6. The method of claim 1 wherein said liquid cleaner includes aliphatic hydrocarbons.

7. The apparatus of claim 1 wherein said liquid cleaner includes chlorinated solvent.

8. Apparatus comprising:
an electric arc welder gun of a type including:
  a flexible conduit disposed in said housing, said flexible conduit having a first end for feeding a consumable welding wire therein, a second end adapted to engage with a tubular welding tip for selectively feeding said consumable welding wire through said other end of the flexible conduit and through said tubular welding tip;

means for selectively removing said consumable wire from a major portion of said flexible conduit;

means for injecting a liquid cleaner into said flexible conduit into the first or second end thereof at least until at least some of such liquid exits the other end thereof;

means for forcing the liquid cleaner from said flexible conduit; and means for selectively moving said consumable wire back into the flexible conduit and tubular welding tip for use in a welding process.

9. The apparatus of claim 8 including:
means for forcing air through said flexible conduit for removing said liquid cleaner from said flexible conduit.

10. The apparatus of claim 8 wherein said liquid cleaner comprises mineral spirits.

11. The apparatus of claim 8 wherein said liquid cleaner comprises Barothane.

* * * * *